United States Patent
Young et al.

(10) Patent No.: US 11,916,988 B2
(45) Date of Patent: Feb. 27, 2024

(54) METHODS AND SYSTEMS FOR MANAGING SIMULTANEOUS DATA STREAMS FROM MULTIPLE SOURCES

(71) Applicant: Bose Corporation, Framingham, MA (US)

(72) Inventors: Douglas Warren Young, Arlington, MA (US); Rasmus Abildgren, Skørping (DK); Casper Stork Bonde, Støvring (DK)

(73) Assignee: Bose Corporation, Framingham, MA (US)

( * ) Notice: Subject to any disclaimer, the term of this patent is extended or adjusted under 35 U.S.C. 154(b) by 178 days.

(21) Appl. No.: 17/024,328

(22) Filed: Sep. 28, 2020

(65) Prior Publication Data
US 2022/0103607 A1    Mar. 31, 2022

(51) Int. Cl.
| | |
|---|---|
| *H04L 65/70* | (2022.01) |
| *H04L 65/61* | (2022.01) |
| *G06F 3/16* | (2006.01) |
| *H04L 65/65* | (2022.01) |
| *H04L 65/75* | (2022.01) |
| *H04L 67/51* | (2022.01) |

(52) U.S. Cl.
CPC ............. *H04L 65/61* (2022.05); *G06F 3/167* (2013.01); *H04L 65/65* (2022.05); *H04L 65/70* (2022.05); *H04L 65/764* (2022.05); *H04L 67/51* (2022.05)

(58) Field of Classification Search
CPC ....... H04L 65/61; H04L 65/70; H04L 65/764; H04L 65/65; H04L 67/51; G06F 3/167
See application file for complete search history.

(56) References Cited

U.S. PATENT DOCUMENTS

| | | | | |
|---|---|---|---|---|
| 10,135,732 | B2* | 11/2018 | Rijsman ................. | H04L 45/02 |
| 10,966,047 | B1* | 3/2021 | Tong ..................... | H04R 5/033 |
| 11,038,937 | B1* | 6/2021 | D'Amato ............... | H04L 65/65 |

(Continued)

OTHER PUBLICATIONS

Woolley, Martin. Bluetooth Core Specification Version 5.2. Feature Summary [online]. Jan. 6, 2020 [retrieved on Jul. 17, 2020]. Retrieved from the Internet: <URL: https://www.bluetooth.com/bluetooth-resources/bluetooth-core-specification-version-5-2-feature-overview/>.

*Primary Examiner* — Dhairya A Patel
(74) *Attorney, Agent, or Firm* — BOND, SCHOENECK & KING, PLLC

(57) ABSTRACT

A system and method for managing simultaneous data streams from multiple sources is provided. At least one paired audio device within the system, is a managing device and coordinates the audio playback presented in each paired audio device. In this way, each device can produce an audio playback associated with different streams simultaneously. In some examples, the managing device is one of the two devices or a peripheral device, e.g., a smartphone. In some examples, each data stream contains data used to generate a priority level for each data stream. The managing device can allow a data stream having a higher priority level or the data stream with a detected change to "barge-in" causing the playbacks of each device to be associated with a different data stream. Additionally, each device is capable of assuming the role of "stream scanner" to prevent uneven power consumption between the devices within the system.

20 Claims, 9 Drawing Sheets

(56) References Cited

U.S. PATENT DOCUMENTS

| | | | |
|---|---|---|---|
| 2008/0040759 A1* | 2/2008 | She | H04L 65/1043 |
| | | | 725/74 |
| 2012/0117200 A1* | 5/2012 | Millington | H04L 65/80 |
| | | | 709/219 |
| 2016/0366263 A1* | 12/2016 | Song | H04R 25/554 |
| 2017/0048613 A1* | 2/2017 | Smus | H04W 4/80 |
| 2017/0244576 A1* | 8/2017 | Batra | H04W 56/0025 |
| 2019/0230459 A1* | 7/2019 | Sridharan | G06F 3/16 |
| 2020/0174735 A1* | 6/2020 | Gomes | G06F 3/165 |
| 2020/0280814 A1* | 9/2020 | Taylor | G10K 11/178 |
| 2020/0359134 A1* | 11/2020 | Tong | H04R 5/04 |
| 2020/0364621 A1* | 11/2020 | Reimer | G06F 16/489 |
| 2021/0135704 A1* | 5/2021 | El-Hoiydi | H04B 1/7156 |
| 2021/0279126 A1* | 9/2021 | Linsky | G06F 11/1004 |
| 2021/0306448 A1* | 9/2021 | Leppänen | H04R 5/04 |
| 2021/0306749 A1* | 9/2021 | Young | H04H 20/61 |
| 2021/0385886 A1* | 12/2021 | Lo | H04W 76/10 |
| 2022/0070247 A1* | 3/2022 | Wang | G06F 3/165 |
| 2022/0116711 A1* | 4/2022 | Haggai | H04R 5/04 |
| 2022/0124471 A1* | 4/2022 | Chen | H04W 56/00 |
| 2023/0169721 A1* | 6/2023 | Gautron | G06T 15/506 |
| | | | 345/426 |
| 2023/0230605 A1* | 7/2023 | Alakuijala | G10L 19/02 |
| | | | 704/500 |
| 2023/0260529 A1* | 8/2023 | Xiao | G10L 25/78 |
| | | | 704/233 |

\* cited by examiner

METHODS AND SYSTEMS FOR MANAGING SIMULTANEOUS DATA STREAMS FROM MULTIPLE SOURCES

BACKGROUND

Aspects and implementations of the present disclosure are generally directed to systems and methods for broadcasting and receiving wireless data streams, for example, broadcasting and receiving wireless data streams between wireless devices.

Wearable wireless audio devices, e.g., wireless headphones, often utilize paired connections to stream wireless audio data from a source device. Typically, each wireless headphone receives a discrete stream of data specific to each wireless headphone, e.g., the source device produce one stream of data, with at least one channel within the stream associated with the left headphone and one channel within the stream associated with the right headphone.

SUMMARY OF THE DISCLOSURE

The present disclosure relates to systems and methods for managing simultaneous data streams, e.g., isochronous data streams, from multiple sources. In one example, at least one device within the system, e.g., one of at least two paired audio devices, can act as a managing device and can coordinate the audio playback presented in each of the two devices. In this way, and although the devices are paired, each device can produce an audio playback associated with different streams simultaneously. In some examples, the managing device is selected from one of the two devices, and in some examples, the managing device is a peripheral device, e.g., a smartphone or personal computer (PC). In some examples, each isochronous data stream contains data that can be utilized to generate a priority level for each isochronous data stream. In these examples, the managing device may allow an isochronous data stream having a higher priority level than the isochronous data stream that is currently being used to generate the respective audio playbacks to "barge-in" on that playback and automatically cause the playbacks to be associated with the isochronous data stream having the higher priority level. In further examples, each device is capable of scanning the surrounding environment for the isochronous data streams, and for changes in the isochronous data streams and/or their priority levels. In some examples, the device taking on this "stream scanner" role, is the managing device. However, to prevent increased and uneven power consumption between the devices within the system the stream scanner role can be alternated between each device within the system to equalize the increased power burden of this responsibility to multiple devices within the system.

In some examples, the systems and methods discussed herein utilize wireless data transmission, specifically, wireless topologies for broadcasting and transmitting audio streams between devices. For example, Core Specification 5.2 ("The Core Specification") released by the Bluetooth Special Interest Group (SIG) on Jan. 6, 2020, defines new features related to Bluetooth Low Energy (BLE) topologies. One feature described in the 5.2 Core Specification is Broadcast Isochronous Streams which utilize connectionless isochronous communications. A similar feature described by the 5.2 Core Specification is an LE Connected Isochronous Stream, which utilizes connection-oriented isochronous channels to provide a point-to-point isochronous communication stream between two devices, e.g., between peripheral device 102 and devices 104 and 106 (discussed below). As will be described below in detail, the present application is related to systems, devices, and methods to provide a user of a compatible device, with methods of interacting with isochronous communications of source devices, e.g., peripheral device 102 and/or the other devices in the system. In one example, the systems, devices, and methods discussed herein utilize Bluetooth Low-Energy audio topologies enabled by the 5.2 Core Specification (referred to herein as "LE Audio").

For example, LE Audio enables unicast wireless topologies (referred to as "connected isochronous streams") that allow a single Bluetooth audio source (e.g., a smart phone) to transmit multiple audio streams to separate Bluetooth devices at the same time, e.g., wireless headphones. These topologies are intended to improve Bluetooth operation for wireless headphones.

These LE Audio topologies LE, e.g., broadcast isochronous streams (BIS) open up new possibilities for wearable products like truly wireless earbuds. The Core Specification is designed to allow a pair of truly wireless earbuds to sync to a broadcast source and to independently receive left and right audio channels time aligned to the user. With this capability, some users may be interested in tuning into multiple broadcast sources, either simultaneously or by allowing one broadcast source to "barge in" on another source. For instance, in one example, a user in a sports bar or a gym can be presented with a bank of wirelessly enabled televisions that are all broadcasting LE audio. The user may want to "tune in" to a football game in one ear and another program in another ear. Or, perhaps they are watching a program in an airport on both ears but want a gate announcement to "barge in" to the audio they're listening to. In yet another example, the user may want to listen to a tv program in one ear while receiving audio related to a phone call in their other ear.

Broadcast sources may generally present two channels of audio in a broadcast isochronous stream that two wireless earbuds can sync to. Each bud has its own Bluetooth radio but are synced to the same source and can independently choose to receive the left or right channel of audio and play it to the user. Because each earbud has its own Bluetooth radio, it's also possible for each bud to synchronize to a different LE Audio broadcast source independently. This would allow, for instance, the left bud to receive audio from a first broadcast source while the right bud receives audio from a second broadcast source. With the knowledge that the user is only listening to the first broadcast source in only one ear, the left bud could choose to receive both left and right channels of audio from the broadcast source, mix the two channels of audio together and present a mono stream of audio to the user in the left ear. Likewise the right bud could receive both channels of audio from the second broadcast source, mix them and present a different mono stream of audio in the user's right ear.

There are multiple methods that could be used to configure audio separately for each wireless earbud. For instance, two earbuds may have symmetrical control surfaces, which can include a button or touch-capacitive sensor, that could be used independently to cycle through different broadcast sources in range on the left earbud. A similar gesture on the right earbud could also be used to cycle through different broadcast sources independently on the right earbud.

In a different method, a peripheral device, e.g., a smart phone could act as the stream scanner and do a scan of available broadcast sources in range. Using, e.g., a user interface of mobile app running on the peripheral device, the user could select audio sources to independently send to the left and right earbuds. Information about each respective broadcast source could then be communicated to each earbud either through a standard mechanism defined by an LE audio profile, or through other communications between the peripheral device and the left and right earbuds. The left and right earbuds then could tune into their respective broadcast streams.

In another aspect of the invention, the systems described herein could allow one broadcast source to "barge-in" on another broadcast source (like an airport gate announcement), e.g., barging into another broadcast stream that the user is already listening to. This could be managed either by a peripheral device connected to the earbuds, which acts as stream scanner and is scanning for LE Audio broadcast sources periodically over time. As the peripheral device will see new broadcast sources, it could parse metadata for each source and assess whether this is a stream that should "barge in" to the audio the user is currently listening to. Similarly, the broadcast scanner or stream scanner device could monitor broadcast sources in range for a change in state or status that might trigger a "barge-in" event. For instance, an airport broadcast announcement might be broadcasting all the time with metadata describing the source, however it may not always have an active audio stream. When the broadcast source initiates an active stream, it is expected that it will update its periodic advertisements indicating the presence of the active stream. The broadcast scanner or stream scanner device could trigger off of this change in the periodic advertisements to allow a barge-in event on the system. In another extension of the systems described herein, the broadcast could do further filtering/processing of metadata from the broadcast source, for instance interpreting metadata like language, flight, gate, announcement type, etc. to more intelligently to decide when to interrupt the user's listening experience to play a broadcast announcement and when to ignore the broadcast announcement.

The earbuds themselves could also act as the broadcast scanner or stream scanner device without the aid of a peripheral or a connected device. A given earbud that is currently synchronized and playing audio from a connected or broadcast isochronous stream cannot be constantly scanning for broadcast sources in range, however two earbuds could alternate scanning for broadcast sources in a coordinated fashion. This could have the added benefit of spreading Bluetooth activity between the buds so to minimize the battery life impact on any one earbud of constantly scanning for a broadcast source. As each earbud completes a scan, it could share the results/any changes in scan data with the other earbud or other devices of the system. Or the earbuds could independently monitor broadcast sources each earbud receives against a common set of decision criteria and inform the other bud if criteria have been met that should trigger a barge-in event. Similar methods could also be employed to allow a broadcast stream to barge into a connected isochronous stream that the user is currently listening to on their earbuds.

In one example, a device for managing data streams from multiple sources is provided, wherein the device includes a radio configured to scan for multiple data streams and at least one processor. The at least one processor is configured to: detect an isochronous data stream from a first source device, and in response to identifying a change in the isochronous data stream while causing an audio playback from a data stream from a second source device, initiate an audio playback using the isochronous data stream.

In one aspect, the data stream from the second source device is another isochronous data stream.

In one aspect, the data stream from the second source device is a Bluetooth Classic Audio data stream.

In one aspect, the device is a mobile computing device.

In one aspect, the audio playback using the isochronous data stream is initiated at a speaker of the mobile computing device.

In one aspect, the audio playback using the isochronous data stream is initiated at a remote device that is wirelessly paired with the device.

In one aspect, identifying the change in the isochronous data stream includes parsing metadata associated with the isochronous data stream.

In one aspect, the metadata indicates a change in audio language and/or content in the isochronous data stream that has been selected by and/or is desirable to a user of the device.

In one aspect, identifying the change in the isochronous data stream includes identifying that the isochronous data stream includes an active audio stream.

In one aspect the isochronous data stream is a Bluetooth LE Audio data stream.

In one aspect, the isochronous data stream includes audio data encoded using the Low Complexity Communications Codec (LC3).

In one aspect, the audio playback from the data stream from the second source device is stopped and/or muted prior to initiating audio playback using the isochronous data stream.

In one aspect, initiating audio playback using the isochronous data stream includes mixing audio data from the isochronous data stream with audio data from the data stream from the second audio source device.

In one aspect, the audio data from the isochronous data stream is played back at a louder volume than the audio data from the data stream.

In another example, a method for managing data streams from multiple sources is provided, the method including: scanning for, via a radio, multiple data streams; detecting, via at least one processor, an isochronous data stream from a first source device; identifying, via the at least one processor, a change in the isochronous data stream while causing an audio playback from a data stream from a second source device; initiating an audio playback using the isochronous data stream in response to identifying the change.

In one aspect, the data stream from the second source device is another isochronous data stream.

In one aspect, the data stream from the second source device is a Bluetooth Classic Audio data stream.

In one aspect, the at least one processor is arranged, on, in, or in communication with a mobile computing device.

In one aspect, the audio playback using the isochronous data stream is initiated at a speaker of the mobile computing device.

In one aspect, the audio playback using the isochronous data stream is initiated at a remote device that is wirelessly paired with the mobile computing device.

In one aspect, identifying the change in the isochronous data stream includes parsing metadata associated with the isochronous data stream.

In one aspect, the metadata indicates a change in audio language and/or content in the isochronous data stream that has been selected by and/or is desirable to a user of the device.

In one aspect, identifying the change in the isochronous data stream includes identifying that the isochronous data stream includes an active audio stream.

In one aspect, the isochronous data stream is a Bluetooth LE Audio data stream.

In one aspect, the isochronous data stream includes audio data encoded using the Low Complexity Communications Codec (LC3).

In one aspect, the audio playback from the data stream from the second source device is stopped and/or muted prior to initiating audio playback using the isochronous data stream.

In one aspect, initiating audio playback using the isochronous data stream includes mixing audio data from the isochronous data stream with audio data from the data stream from the second audio source device.

In one aspect, the audio data from the isochronous data stream is played back at a louder volume than the audio data from the data stream.

In another example, a system for managing data streams from multiple sources is provided, the system including: a first device comprising a first speaker, the first device configured to: receive a first isochronous data stream from a first source device, and render a first audio playback via the first speaker using the first isochronous data stream; and, a second device comprising a second speaker, the second device configured to receive a second isochronous data stream from a second source device different from the first source device and render a second audio playback via the second speaker using the second isochronous data stream, wherein the first audio device is paired with the second audio device.

In one aspect, the first device further comprises a first radio configured to receive at least the first isochronous data stream and the second device comprises a second radio different than the first radio, the second radio configured to receive at least the second isochronous data stream.

In one aspect, the first isochronous data stream includes left-channel audio data and right-channel audio data associated with the first source device and wherein second isochronous data stream includes left-channel audio data and right-channel audio data associated with the second source device.

In one aspect, the first device is configured to obtain the first isochronous data stream and the second isochronous data stream and instruct the second device, via a separate data stream, to render the second audio playback via the second speaker using the second isochronous data stream.

In one aspect, the second device is configured to obtain the first isochronous data stream and the second isochronous data stream and instruct the first device, via a separate data stream, to render the first audio playback via the first speaker using the first isochronous data stream.

In one aspect, the system further includes a peripheral device configured to obtain the first isochronous data stream and the second isochronous data stream and instruct the first device, via a separate data stream, to render the first audio playback via the first speaker using the first isochronous data stream, and instruct the second device, via the separate data stream, to render the second audio playback via the second speaker using the second isochronous data stream.

In one aspect, the first device is configured to receive the first isochronous data stream and the second isochronous data stream, and the first device comprises a first control surface, the first control surface comprising a first button or a first touch-capacitive sensor configured to receive a first user input, wherein in response to receiving the first user input the first device is configured to switch between the first isochronous data stream and the second isochronous data stream such that the first audio playback cycles through association with the first isochronous data stream and the second isochronous data stream.

In one aspect, the second device is configured to receive the first isochronous data stream and the second isochronous data stream, and the second device comprises a second control surface, the second control surface comprising a second button or a second touch-capacitive sensor configured to receive a second user input, wherein in response to receiving the second user input the second audio device is configured to switch between the first isochronous data stream and the second isochronous data stream such that the second audio playback cycles through association with the first isochronous data stream and the second isochronous data stream.

In one aspect, the first isochronous data stream and the second isochronous data stream are selected from a connected isochronous stream or a broadcast isochronous stream.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems and methods for managing simultaneous data streams, e.g., isochronous data streams, from multiple sources. In one example, at least one device within the system, e.g., one of at least two paired audio devices, can act as a managing device and can coordinate the audio playback presented in each of the two audio devices. In this way, and although the devices are paired, each device can produce an audio playback associated with different streams simultaneously. In some examples, the managing device is selected from one of the two devices, and in some examples, the managing device is a peripheral device, e.g., a smartphone or personal computer (PC). In some examples, each isochronous data stream contains data that can be utilized to generate a priority level for each isochronous data stream. In these examples, the managing device may allow an isochronous data stream having a higher priority level than the isochronous data stream that is currently being used to generate the respective audio playbacks to "barge-in" on that playback and automatically cause the playbacks to be associated with the isochronous data stream having the higher priority level. In further examples, each device is capable of scanning the surrounding environment for the isochronous data streams, and for changes in the isochronous data streams and/or their priority levels. In some examples, the device taking on this "stream scanner" role, is the managing device. However, to prevent increased and uneven power consumption between the devices within the system the scan off-loader role can be alternated between each device within the system to equalize the increased power burden of this responsibility to multiple devices within the system.

Figure 1:
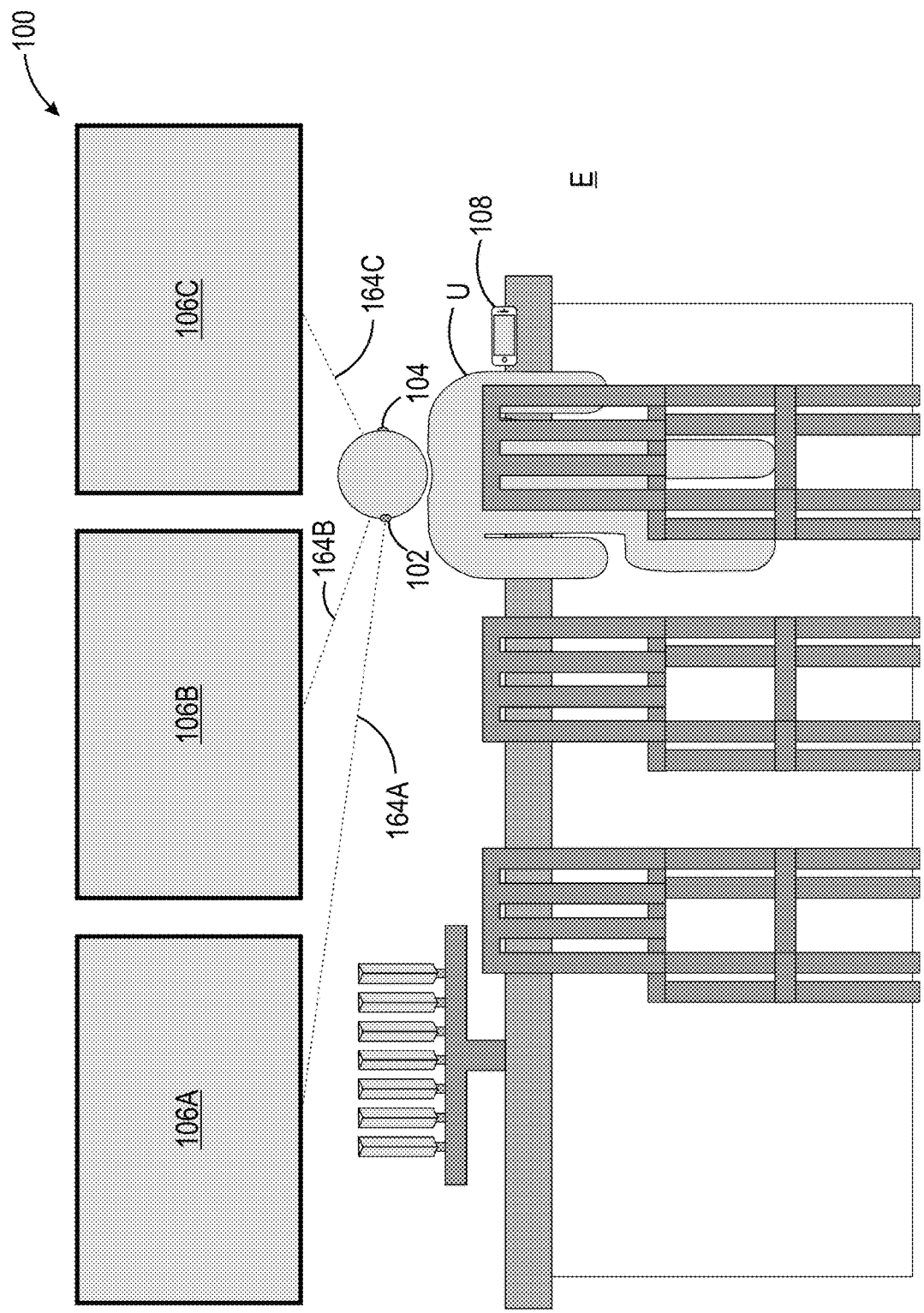
FIG. 1 is a schematic view of system 100 according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an in-the-ear headphone form factor, in other examples the wearable audio device can be an on-ear, around-ear, behind-ear, over-the-ear or near-ear headset, or can be an audio eyeglasses form factor headset. In some examples, the wearable audio device can be an open-ear device that includes an acoustic driver to radiate acoustic energy towards the ear while leaving the ear open to its environment and surroundings.

The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., a source device and an audio device or a plurality of audio devices. In other words, a connected isochronous stream can provide an isochronous audio stream which utilizes at least one established reliable communication channel and/or at least one acknowledged communication channel between the source device and any respective audio devices.

The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-6. FIG. 1 is a schematic view of system 100 employed in an environment E according to the present disclosure. System 100 includes at least one device, e.g., first device 102, and a plurality of source devices 106A-106C (collectively referred to as "source devices 106" or "plurality of source devices 106"). In one example, first device 102 is a wearable audio device, e.g., a pair of over-the-head headphones or headset or a single wireless earbud; however, it should be appreciated that first device 102 can be a speaker, portable speaker, a paired speaker, or a paired portable speaker. In another example, as illustrated in FIGS. 2-6, system 100 can include a plurality of devices, e.g., first device 102 and second device 104. In these examples first device 102 and second device 104 are intended to be a pair of wearable audio devices, e.g., a pair of truly wireless earbuds where first device 102 and second device 104 are arranged to be secured proximate to or within a user's left and right ears, respectively. However, in some alternative examples, it should be appreciated that first device 102 and second device 104 can be speakers, portable speakers, paired speakers or paired portable speakers. In some of the examples described below, system 100 can also include a peripheral device 108, discussed in detail below.

Figure 5:
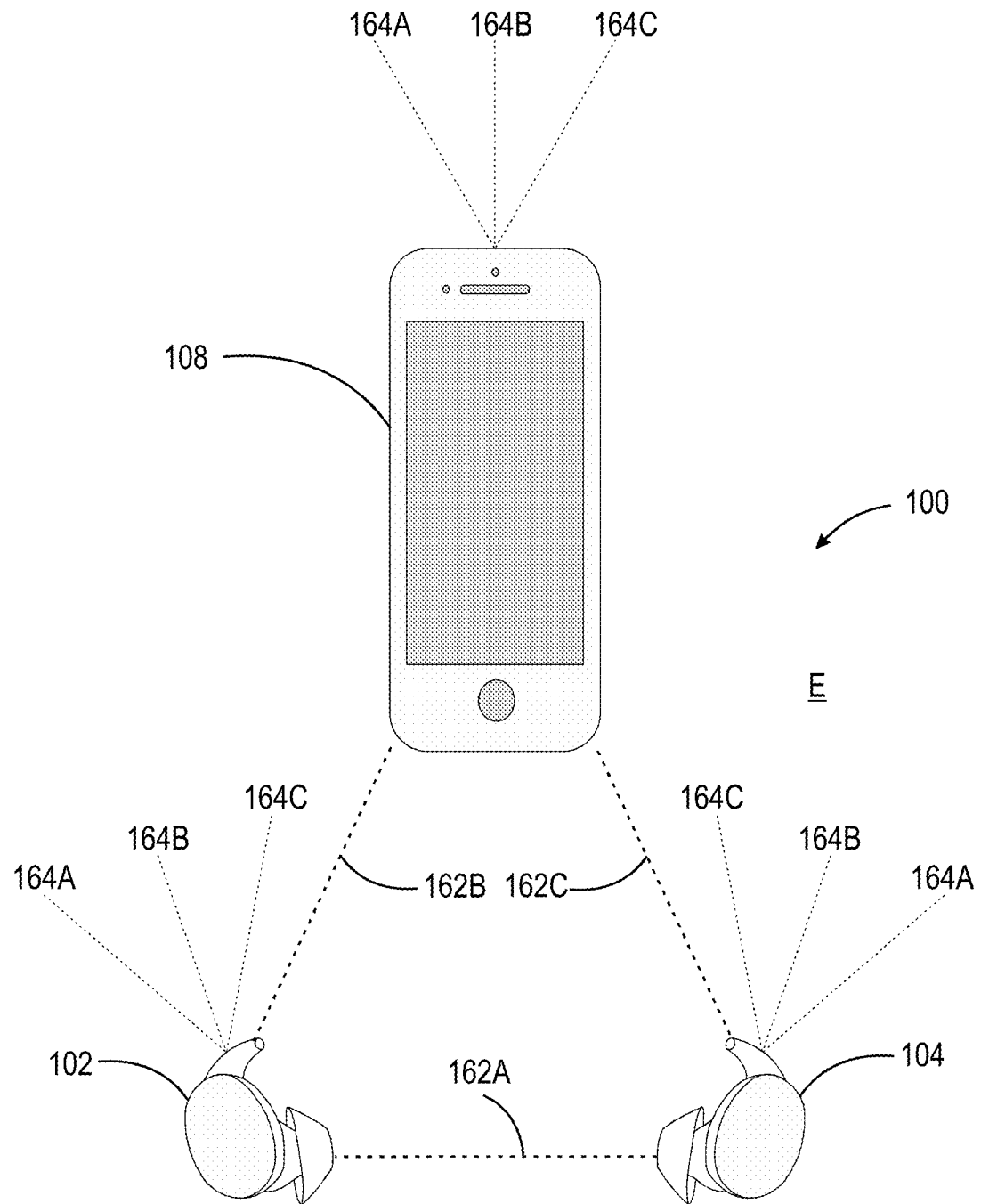
FIG. 5 is a schematic view of system 100 according to the present disclosure.
Figure 6:
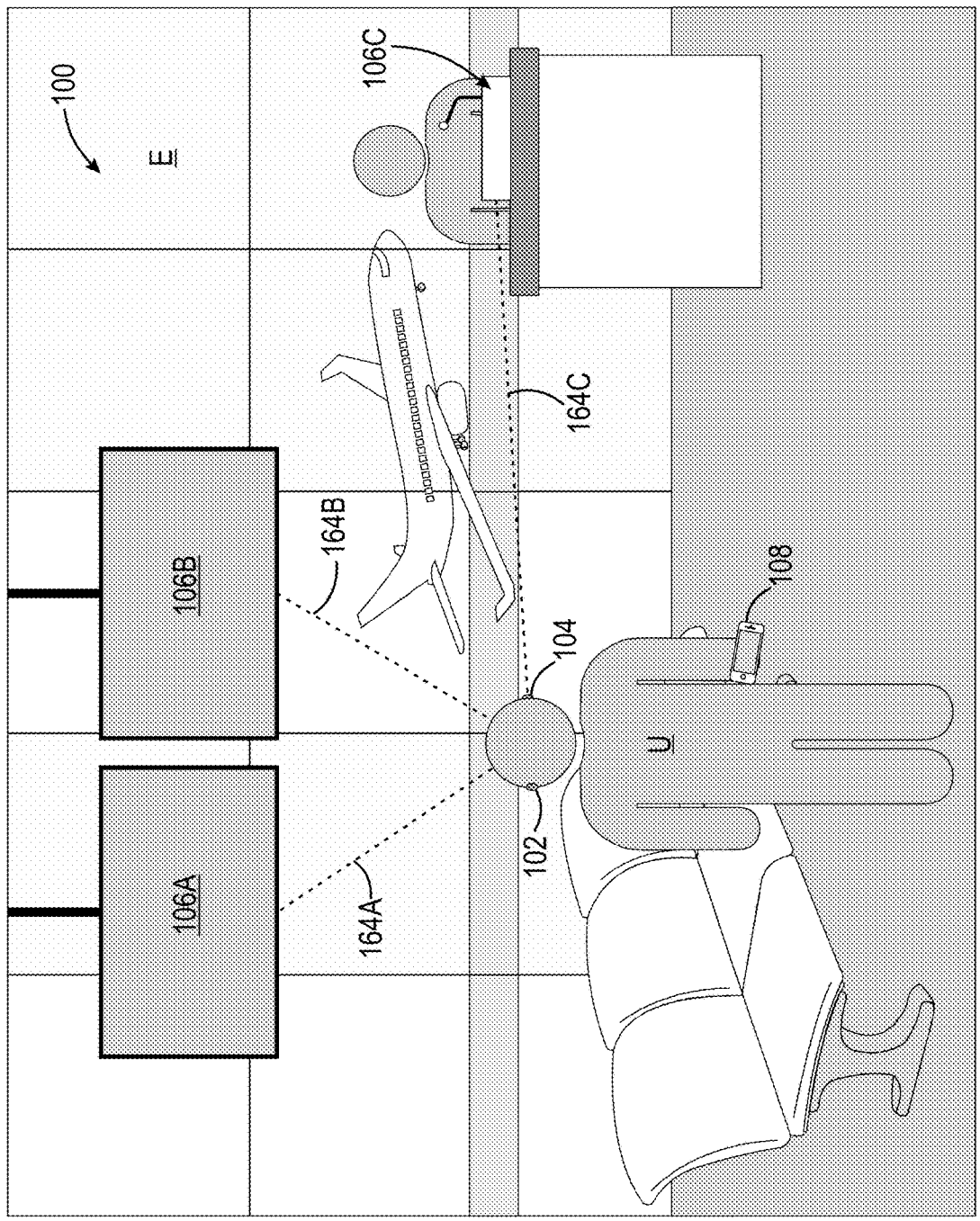
FIG. 6 is a schematic view of system 100 according to the present disclosure.

In some examples, environment E (discussed below) can correspond to a place or location where there are multiple source devices 106, e.g., a sports bar (illustrated in FIG. 1), a restaurant, an airport as illustrated in FIG. 6, a gymnasium, etc. As such, in at least some of these examples, each source device of plurality of source devices 106 can be a television capable of broadcasting a data stream, e.g., an isochronous data stream, associated with a show, program, or other media being displayed on the screen of the television via a digital packet-based wireless data protocol or any other protocol discussed herein. Although the examples discussed herein refer primarily to broadcasting or producing isochronous data streams, it should be appreciated that each source device is capable of producing or generating data streams other than isochronous data streams, e.g., the data streams may utilize protocols such as Bluetooth Classic, Bluetooth Low-Energy Wi-Fi, etc., that are not isochronous in nature. In another example, at least one source device 106 can take the form of a Public Address (PA) system or other speaker system within a public place such as an airport terminal (shown in FIG. 6) and the broadcasted isochronous stream may be associated with an audio signal containing data related to one or more announcements, e.g., a gate announcement. In other examples, source devices 106 are selected from: a wireless speaker, a portable speaker, a smart phone, tablet, personal computer, a wireless access point configured to connect to a remote server via the Internet, or any device capable of sending and/or receiving wireless data streams within environment E, e.g., plurality of isochronous data streams 164A-164C (discussed below). As will be discussed below with reference to FIGS. 1-6, within environment E, a user U can utilize or interact with one of the devices connected to the system to switch system 100 from a default mode to a broadcast discovery mode (not shown). While in broadcast discovery mode, the user U may provide a user input (e.g. first user input 126 or second user input 144 discussed below) to cycle through a plurality of wireless data streams (e.g., plurality of isochronous data streams 164A-164C discussed below) corresponding to at least one of the respective source devices 106. It should be appreciated that although only three source device 106A-106C are illustrated, more or less source devices may be utilized, e.g., two, four, six, eight, 10, etc.

Figures 2A, 2B:
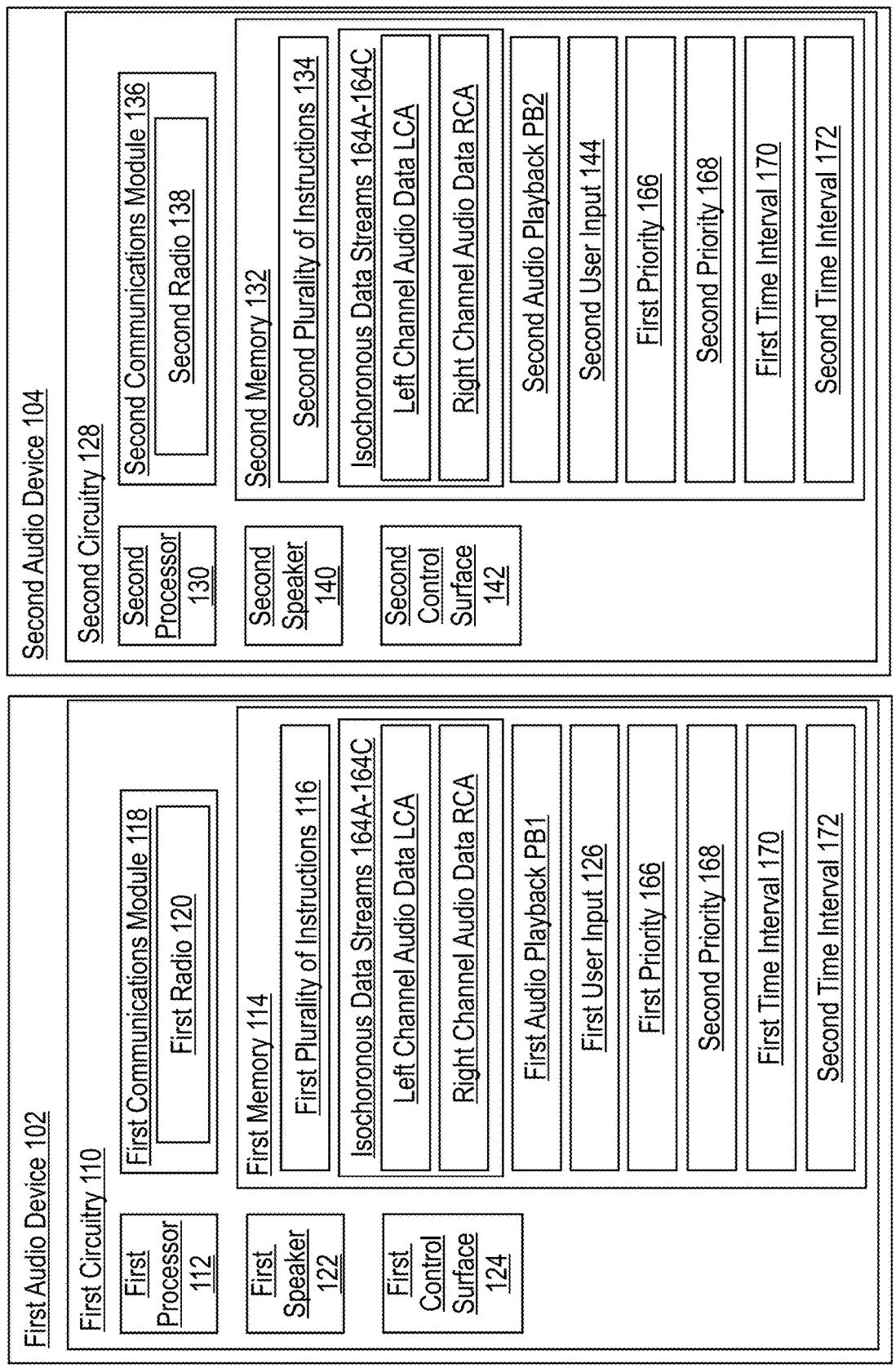
FIG. 2A is a schematic representation of the components of a first audio device according to the present disclosure.
FIG. 2B is a schematic representation of the components of a second audio device according to the present disclosure.

As illustrated in FIG. 2A first device 102 comprises first circuitry 110. First circuitry 110 includes first processor 112 and first memory 114 configured to execute and store, respectively, a first plurality of non-transitory computer-readable instructions 116, to perform the various functions of first device 102 and first circuitry 110 as will be described herein. First circuitry 110 also includes a first communications module 118 configured to send and/or receive wireless data, e.g., data relating to the plurality of isochronous data streams 164A-164C (discussed below) from the plurality of source devices 106. To that end, first communications module 118 can include at least one radio or antenna, e.g., a first radio 120 capable of sending and receiving wireless data. In some examples, first communications module 118 can include, in addition to at least one radio (e.g., first radio 120), some form of automated gain control (AGC), a modulator and/or demodulator, and potentially a discrete processor for bit-processing that are electrically connected to first processor 112 and first memory 114 to aid in sending and/or receiving wireless data. As will be discussed below, first circuitry 110 of first audio device 102 can also include a first speaker 122, e.g., a loudspeaker or acoustic transducer, that is electrically connected to first processor 112 and first memory 114 and configured to electromechanically convert an electrical signal into audible acoustic energy within environment E, i.e., a first audio playback PB1 (discussed below). In some examples, the electrical signal and the audible acoustic energy are associated with the data included in the plurality of isochronous data streams 164A-164C (discussed below).

First device 102 can further include a sensor or plurality of sensors electrically connected to first circuitry 110. The sensor or plurality of sensors can take the form of a control surface, e.g., first control surface 124, which can include one or more buttons, one or more touch-capacitive sensors, one or more touch screen sensors or any combination thereof. In some examples, the sensor or plurality of sensors can be selected from at least one of: an accelerometer, a gyroscope, a magnetometer, a proximity sensor, a Global Positioning System (GPS) sensor, a near-field communication (NFC) unit, a camera, or a microphone. As will be described below, the user U, while in environment E, can engage or otherwise interact with first device 102, e.g., by using their finger or portion of their hand to engage first control surface 124, or by performing an action that when interpreted by any other sensor or sensors discussed above, indicate an affirmative action by the user. The affirmative action, received by the sensor or plurality of sensors results in an input generated by the user, e.g., a first user input 126. It should be appreciated that although described as an action detected by a single sensor, first user input 126 can utilize data generated by one or more of the plurality of sensors of the first device 102 discussed above. As discussed herein, and in one example, first user input 126 is intended to be a user input which utilizes at least one sensor, e.g., first control surface 124, to switch first device 102 and/or second device 104 from a default mode to a broadcast discovery mode (not shown). In other examples discussed below, first user input 126 can operate to cycle through available isochronous data streams, e.g., data streams of the plurality of isochronous data streams 164A-164C. In one example, first user input 126 is a voice input where the sensor or plurality of sensors includes a microphone. In another example, first user input 126 is obtained from first control surface 124 which includes a button or touch-capacitive sensor. In a further example, first user input 126 is obtained is a gyroscope or accelerometer arranged to generate a signal in response to a gesture or motion of user U.

As illustrated in FIG. 2B, second device 104 comprises second circuitry 128. Second circuitry 128 includes second processor 130 and second memory 132 configured to execute and store, respectively, a second plurality of non-transitory computer-readable instructions 134, to perform the various functions of second audio device 104 and second circuitry 128 as will be described herein. Second circuitry 128 also includes a second communications module 136 configured to send and/or receive wireless data, e.g., data relating to the plurality of isochronous data streams 164A-164C (discussed below) from the plurality of source devices 106. To that end, second communications module 136 can include at least one radio or antenna, e.g., a second radio 138 capable of sending and receiving wireless data. In some examples, second communications module 136 can include, in addition to at least one radio (e.g., second radio 138), some form of automated gain control (AGC), a modulator and/or demodulator, and potentially a discrete processor for bit-processing that are electrically connected to second processor 130 and second memory 132 to aid in sending and/or receiving wireless data. As will be discussed below, second circuitry 128 of second audio device 104 can also include a second speaker 140, e.g., a loudspeaker or acoustic transducer, that is electrically connected to second processor 130 and second memory 132 and configured to electromechanically convert an electrical signal into audible acoustic energy within environment E, i.e., a second audio playback PB2 (discussed below). In some examples, the electrical signal and the audible acoustic energy are associated with the data included in the plurality of isochronous data streams 164A-164C (discussed below).

Second device 104 can further include a sensor or plurality of sensors electrically connected to second circuitry 128. The sensor or plurality of sensors can take the form of a control surface, e.g., second control surface 142, which can include one or more buttons, one or more touch-capacitive sensors, one or more touch screen sensors or any combination thereof. In some examples, the sensor or plurality of sensors can be selected from at least one of: an accelerometer, a gyroscope, a magnetometer, a proximity sensor, a Global Positioning Service (GPS) sensor, a near-field communication (NFC) unit, a camera, or a microphone. As will be described below, the user U, while in environment E, can engage or otherwise interact with second device 104, e.g., by using their finger or portion of their hand to engage second control surface 142, or by performing an action that when interpreted by any other sensor or sensors discussed above, indicate an affirmative action by the user. The affirmative action, received by the sensor or plurality of sensors, results in an input generated by the user, e.g., a second user input 144. It should be appreciated that although described as an action detected by a single sensor, second user input 144 can utilize data generated by one or more of the plurality of sensors of the second device 104 discussed above. As discussed herein, and in one example, second user input 144 is intended to be a user input which utilizes at least one sensor, e.g., second control surface 142, to switch first device 102 and/or second device 104 from a default mode to a broadcast discovery mode (not shown). In other examples discussed below, second user input 144 can operate to cycle through available isochronous data streams, e.g., data streams of the plurality of isochronous data streams 164A-164C. In one example, second user input 144 is a voice input where the sensor or plurality of sensors includes a microphone. In another example, second user input 144 is obtained from second control surface 142 which includes a button or touch-capacitive sensor. In a further example, second user input 144 is obtained is a gyroscope or accelerometer arranged to generate a signal in response to a gesture or motion of user U.

Figure 3:
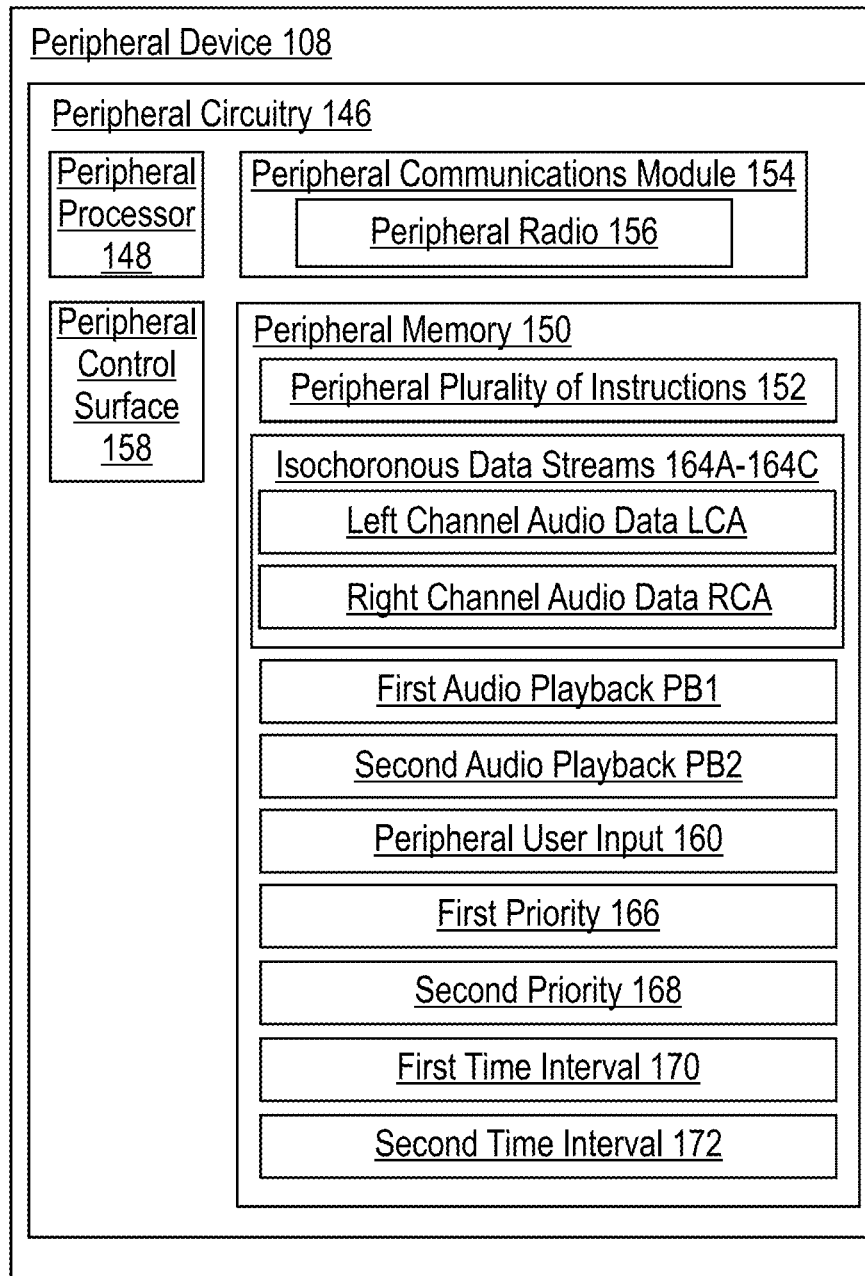
FIG. 3 is a schematic representation of the components of a peripheral device according to the present disclosure.

As illustrated in FIG. 3, as discussed above, in some examples, system 100 further includes a peripheral device 108. Peripheral device 108 is intended to be a wired or wireless device capable of sending and/or receiving data related to the plurality of isochronous streams 164A-164C discussed above to at least one audio device, e.g., first device 102 and/or second device 104. In one example, as illustrated in FIGS. 1 and 5-6, peripheral device 108 is a smart phone capable of sending data from plurality of isochronous data streams 164A-164C to first device 102 and/or second device 104. Although not illustrated, it should be appreciated that peripheral device 108 can also be selected from at least one of: a personal computer, a mobile computing device, a tablet, a smart speaker, a smart speaker system, a smart hub, a smart television, or any other device capable of sending or receiving data from plurality of isochronous data streams 164A-164C (discussed below). In some examples, peripheral device 108 is a remote device that is wirelessly paired with first device 102 and/or second device 104 Accordingly, peripheral device 108 can comprise peripheral circuitry 146. Peripheral circuitry 146 includes peripheral processor 148 and peripheral memory 150 configured to execute and store, respectively, a plurality of non-transitory computer-readable instructions, e.g., peripheral instructions 152, to perform the various functions of peripheral device 108 and peripheral circuitry 146 as will be described herein. Peripheral circuitry 146 also includes a peripheral communications module 154 configured to send and/or receive wireless data, e.g., data relating to the plurality of isochronous data streams 164A-164C (discussed below) from the plurality of source devices 106. To that end, peripheral communications module 154 can include at least one radio or antenna, e.g., a peripheral radio 156 capable of sending and receiving wireless data. In some examples, peripheral communications module 154 can include, in addition to at least one radio (e.g., peripheral radio 156), some form of automated gain control (AGC), a modulator and/or demodulator, and potentially a discrete processor for bit-processing that are electrically connected to peripheral processor 148 and peripheral memory 150 to aid in sending and/or receiving wireless data. In some examples, peripheral circuitry 146 of peripheral device 108 can also include a loudspeaker or acoustic transducer that is electrically connected to peripheral processor 148 and peripheral memory 150 and configured to electromechanically convert an electrical signal into audible acoustic energy within environment E, i.e., an audio playback (discussed below). In some examples, the electrical signal and the audible acoustic energy are associated with the data included in the plurality of isochronous data streams 164A-164C (discussed below). Additionally, peripheral device 108 can include, within the set of non-transitory computer-readable instructions, one or more applications, e.g., a mobile application capable of interacting with and communicating with each audio device within the system, i.e., at least first audio device 102 and second audio device 104.

Peripheral device 108 can further include a sensor or plurality of sensors electrically connected to peripheral circuitry 146. The sensor or plurality of sensors can take the form of a control surface, e.g., peripheral control surface 158, which can include one or more buttons, one or more touch-capacitive sensors, one or more touch screen sensors or any combination thereof. In some examples, the sensor or plurality of sensors can be selected from at least one of: an accelerometer, a gyroscope, a magnetometer, a proximity sensor, a Global Positioning Service (GPS) sensor, a near-field communication (NFC) unit, a camera, or a microphone. As will be described below, the user U, while in environment E, can engage or otherwise interact with peripheral audio device 108, e.g., by using their finger or portion of their hand to engage peripheral control surface 158, or by performing an action that when interpreted by any other sensor or sensors discussed above, indicate an affirmative action by the user. The affirmative action, received by the sensor or plurality of sensors, results in an input generated by the user, e.g., a peripheral user input 160. It should be appreciated that although described as an action detected by a single sensor, peripheral user input 160 can utilize data generated by one or more of the plurality of sensors of the peripheral device 108 discussed above. As discussed herein, and in one example, peripheral user input 160 is intended to be a user input which utilizes at least one sensor, e.g., peripheral control surface 160, to switch first device 102, second device 104, and/or peripheral device 108 from a default mode to a broadcast discovery mode (not shown). In other examples discussed below, peripheral user input 160 can operate to cycle through available isochronous data streams, e.g., data streams of the plurality of isochronous data streams 164A-164C. In one example, peripheral user input 160 is a voice input where the sensor or plurality of sensors includes a microphone. In another example, peripheral user input 160 is obtained from peripheral control surface 158 which includes a button, touch-capacitive sensor, or touch screen sensor. In a further example, peripheral user input 160 is obtained is a gyroscope or accelerometer arranged to generate a signal in response to a gesture or motion of user U.

Figure 4:
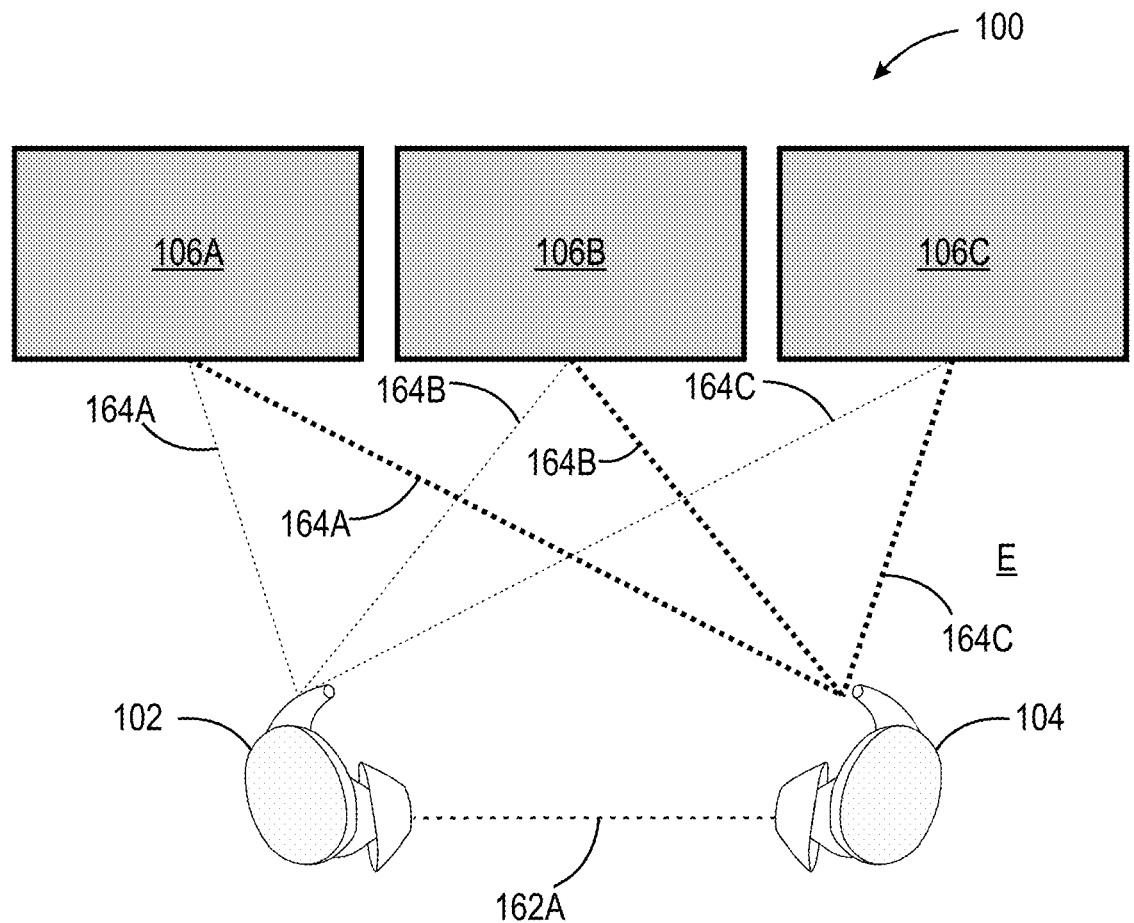
FIG. 4 is a schematic view of system 100 according to the present disclosure.

Prior to and/or during operation of system 100, as will be discussed below, the devices of system 100 can be configured to established communication data streams between each other. For example, as illustrated in FIGS. 4-6, system 100 can be configured to establish a first communication data stream 162A between first device 102 and second device 104 (shown in FIGS. 4-5), establish a second communication data stream 162B between first device 102 and peripheral device 108 (shown in FIG. 5), and establish a third communication data stream 162C between second device 104 and peripheral device 108 (shown in FIG. 5). Each communication data stream, i.e., first communication data stream 162A, second communication data stream 162B, and third communication data stream 162C (collectively referred to as "communication data streams 162" or "plurality of communication data streams 162") can utilize various wireless data protocols or methods of transmission e.g., Bluetooth Protocols, Bluetooth Classic Protocols, Bluetooth Low-Energy Protocols, LE Audio protocols, Asynchronous Connection-Oriented logical transport (ACL) protocols, Radio Frequency (RF) communication protocols, WiFi protocols, Near-Field Magnetic Inductance (NFMI) communications, LE Asynchronous Connection (LE ACL) logical transport protocols, or any other method of transmission of wireless data suitable for sending and/or receiving audio data streams, e.g., first audio stream 146A or second audio stream 146B. In one example, the plurality of communication data streams 162 can utilize broadcast isochronous streams and/or connected isochronous streams of LE Audio and may also utilize the LC3 audio codec. In another example, first communication data stream 162A established between first device 102 and second device 104 utilizes a broadcast isochronous stream, a connected isochronous stream, or asynchronous connection-oriented (ACL) logical transport protocol. It should be appreciated that each communication data stream of plurality of communication data streams 162 can include a communication stream that utilizes at least one of the protocols listed above in any conceivable combination. As will be discussed below, these communication data streams can be utilized by system 100 to send and/or receive data obtained via the plurality of isochronous data streams 164A-164C (also referred to herein as "data streams" or "data streams 164A-164C") from source devices 106. In some examples, these communication data streams are established between two devices within the system based on a previous registration or pairing of the two devices using at least one of the wireless protocols discussed above. In other words, each device of system 100 can be paired to at least one other device within the system. In one example, first device 102 and second device 104 are paired audio devices, e.g., paired truly wireless earbuds or paired speakers. As used herein, the term "paired", along with its ordinary meaning to those with skill in the art, is intended to mean, establishing a data connection between two devices based on a known relationship and/or identity of the devices. The devices may initially exchange credentials, e.g., a Bluetooth passkey, between each other, and establish a connection between the two devices that share the passkey. The exchange of credentials can take place in a special pairing mode of the two devices to indicate ownership of both devices and/or the intent to pair. Once the devices are paired, they are capable of establishing future connections based on the shared pass key and/or the known identity of the devices.

As discussed above, each source device 106 can broadcast or otherwise transmit a stream of data, e.g., an isochronous data stream of plurality of isochronous data streams 164A-164C, within environment E. In one example, each isochronous data stream of the plurality of isochronous data streams 164A-164C corresponds to an independent isochronous data stream broadcasted or transmitted by one source device of plurality of source devices 106A-106C. Each isochronous data stream of the plurality of isochronous data streams may utilize LE Audio protocols and each stream can be a broadcast isochronous stream or a connected isochronous stream as discussed above. Each isochronous data stream of plurality of isochronous data streams 164A-164C, can contain audio data associated with a television show, movie, audio broadcast, podcast, or other media program with associated audio data. In another example, environment E is an airport or airport terminal, and at least one source device 106 can take the form of a Public Address (PA) system (shown in FIG. 6) and the broadcasted isochronous stream may be associated with an audio signal containing data related to one or more announcements, e.g., a gate announcement. As described above, it should be appreciated that more or less than three source devices 106A-106C can be provided, therefore, it should also be appreciated that more or less than three isochronous data streams 164A-164C can be provided, e.g., two, four, six, eight, ten, etc.

To enable these broadcasts or transmissions, and although not illustrated, each source device 106 can include similar components as the other devices of system 100 discussed above, e.g., similar components as described with respect to first device 102, second device 104, and/or peripheral device 108. For example, each source device 106 can include a source processor and a source memory configured to execute and store, respectively, a set of non-transitory computer-readable instructions, i.e., source instructions, to perform the various functions of each source device as will be described herein. Each source device can include circuitry configured to electrically connect the respective processors and the respective memories. Each source circuitry can also include a source communications module that comprises at least one source antenna or source radio configured to receive electrical signals from source device 106 and broadcast or transmit wireless data, e.g., the data of isochronous data streams 164.

Each isochronous data stream of the plurality of isochronous data streams 164A-164C (collectively referred to as "isochronous data streams 164" or "plurality of isochronous data streams 164") can contain left channel audio data LCA and right channel audio data RCA. Left channel audio data LCA is intended to be a portion of a respective isochronous data stream intended to be rendered by, e.g., a speaker or acoustic transducer, located proximate the user U's left ear. Similarly right channel audio data RCA is intended to be a portion of a respective isochronous data stream intended to be rendered by, e.g., a speaker or acoustic transducer, located proximate the user U's right ear. In some examples, as will be discussed below, the left channel audio data LCA and the right channel audio data RCA can be mixed by at least one of the devices of system 100 and rendered into audible sound within environment E using at least one loudspeaker or acoustic transducer of system 100, e.g., via first audio playback PB1 of first device 102 or via second audio playback PB2 of second device 104.

In at least some of the example implementations discussed herein, the user U may desire to listen to the audio data associated with more than one isochronous data stream simultaneously. As each device within system 100, e.g., first device 102, second device 104, and/or peripheral device 108, is configured to receive one or more isochronous data streams broadcasted or transmitted by each of the plurality of source devices 106 within environment E, one or more devices of the system can be responsible for managing or otherwise coordinating the data used to generate the audio playbacks rendered at the first device 102 and the second device 104 using first speaker 122 and second speaker 140, respectively, and provide simultaneous playback of the audio from at least two streams using first device 102 and second device 104.

For example, during operation and as illustrated in FIG. 4, system 100 can include a plurality of paired or otherwise pre-registered audio devices, i.e., first device 102 and second device 104 (e.g., paired truly wireless earbuds) within environment E, where environment E is a sports bar, restaurant, or other public space having a plurality of source devices 106A-106C (e.g., wirelessly enabled televisions) capable of simultaneously broadcasting a respective plurality of isochronous data streams 164A-164C. In this example, each isochronous data stream 164A-164C can include audio data associated with a tv show, movie, or other video media playing on, or otherwise being displayed on, each respective source device 106A-106C. As illustrated, each device, i.e., first device 102 and second device 104, can receive each of the plurality of isochronous data streams 164A-164C. In this example, one of the two devices, e.g., first device 102, can be designated or otherwise assigned the role of manager within the system. The managing device, e.g., first device 102, is configured to coordinate the playback of each stream by each device within the system using, for example, first communication data stream 162A. In this example, the first device 102 can exchange communication data via the first communication data stream 162A to coordinate the playback of each device such that first device 102, using first speaker 122, generates first audio playback PB1 associated with the audio data of one of the isochronous data streams, e.g., first isochronous data stream 164A, while second device 104, using second speaker 140, generates second audio playback PB2 associated with the audio data of one of the remaining isochronous streams, e.g., second isochronous data stream 164B. In this way, one of the devices will render or otherwise generate its audio playback using one of the isochronous data streams while the other device will render or otherwise generate its audio playback using one of the remaining isochronous data streams, and the user U will perceive simultaneous audio playback associated with audio data from two different source devices 106A and 106B. Alternatively, the managing device, e.g., first device 102, can receive the isochronous data streams within environment E and forward or otherwise transmit the data associated with the isochronous data stream that should be used to generate the second audio playback PB2, to second device 104 using first communication data stream 162A.

In this example, each device can be configured to receive both the left channel audio data LCA and the right channel audio data RCA of each isochronous data stream 164A-164C. Prior to playback by each respective device, each device can mix the left channel audio data LCA with the right channel audio data RCA into a single audio data channel and playback the mixed single channel audio data in each device's respective audio playback. Continuing with the example above, first device 102 can mix the left channel audio data LCA and right channel audio RCA from the first isochronous data stream 164A, and first audio playback PB1 can be rendered or otherwise generated using the data of the single mixed audio channel that results. Similarly, second device 104 can mix the left channel audio data LCA and right channel audio data RCA from the second isochronous data stream 164B, and second audio playback PB2 can be rendered or otherwise generated using the data of the single mixed audio channel that results. It should be appreciated that during operation, user U can use the sensor or plurality of sensors of first device 102 and/or second device 104, e.g., first control surface 124 or second control surface 142 to cycle through the available isochronous data streams 164 independently. Although the foregoing description utilizes first device 102 as the managing device, it should be appreciated that second device 104 could be selected as managing device capable of coordinating the playbacks as described above and second device 104 is capable of receiving the plurality of isochronous data streams and forward or otherwise transmit the data associated with the isochronous data stream that should be used to generate the first audio playback PB1, to first device 102 using first communication data stream 162A.

In another example, during operation and as illustrated in FIG. 5, system 100 can include a set of paired or otherwise pre-registered audio devices, i.e., first device 102 (e.g., a truly wireless earbud) and a second device 104 (e.g., a truly wireless earbud), as well as a peripheral device 108 within environment E, where environment E is a sports bar, restaurant, or other public space having a plurality of source devices (not shown) capable of simultaneously broadcasting a respective plurality of isochronous data streams 164A-164C. In this example, each isochronous data stream 164A-164C can include audio data associated with a tv show, movie, or other video media playing on, or otherwise being displayed on, each respective source device. Each device, i.e., first device 102, second device 104, and peripheral device 108 can receive each of the plurality of isochronous data streams 164A-164C. In this example, one of the three devices, e.g., peripheral device 108, can take the form of a mobile communication device, e.g., a smart phone, and can be designated or otherwise assigned the role of manager within the system. The managing device, e.g., peripheral device 108, is configured to coordinate the playback of each device within the system using, for example, second communication data stream 162B and third communication data stream 162C. In this example, the peripheral device 108 can exchange communication data via second communication data stream 162B and third communication data stream 162C to coordinate the playback of each device such that first device 102, using first speaker 122, generates first audio playback PB1 associated with the audio data of one of the isochronous data streams, e.g., first isochronous data stream 164A, while second device 104, using second speaker 140, generates second audio playback PB2 associated with the audio data of one of the remaining isochronous streams, e.g., second isochronous data stream 164B. In this way, one of the audio devices will render or otherwise generate its audio playback using one of the isochronous data streams while the other audio device will render or otherwise generate its audio playback using one of the remaining isochronous data streams, and the user U will perceive simultaneous playback from two separate source devices 106. Alternatively, the managing device, e.g., peripheral device 108, can receive the isochronous data streams within environment E and forward or otherwise transmit the data associated with the isochronous data stream that should be used to generate the first audio playback PB1 and second audio playback PB2, to first device 102 and second device 104, respectively, using second communication data stream 162B and third communication data stream 162C, respectively.

In this example, each device can be configured to receive both the left channel audio data LCA and the right channel audio data RCA of each isochronous data stream 164A-164C. Prior to playback or prior to coordinating the playback to each respective device, one or more devices can mix the left channel audio data LCA with the right channel audio data RCA of a given isochronous data stream into a single audio data channel and playback the mixed single channel audio data in each devices respective audio playback. Continuing with the example above, first device 102 can mix the left channel audio data LCA and right channel audio RCA from the first isochronous data stream 164A, and first audio playback PB1 can be rendered or otherwise generated using the data of the single mixed audio channel that results. Similarly, second device 104 can mix the left channel audio data LCA and right channel audio data RCA from the second isochronous data stream 164B, and second audio playback PB2 can be rendered or otherwise generated using the data of the single mixed audio channel that results. Alternatively, as peripheral device 108 is the managing device, peripheral device 108 can mix the left channel audio data LCA and right channel audio data RCA of each isochronous data stream and provide the mixed single audio channel data to each audio device, i.e., first device 102 and second device 104, for their respective playbacks. It should also be appreciated that during operation, user U can use the sensor or plurality of sensors of first device 102, second device 104 or peripheral device 108, e.g., first control surface 124, second control surface 142, or the sensor or plurality of sensors of peripheral device 108 to cycle through the available isochronous data streams 164 independently.

In some examples, each isochronous data stream of the plurality of isochronous data streams 164A-164C can include advertising packets, meta data, or other data that indicates the type of audio data, the content of the audio data, the content of any audio language included, or the type of device broadcasting the audio data and/or the isochronous data stream within environment E. Each type of audio data, content or audio language included in the audio data, or type of device can be associated with a priority level. Based on a comparison of the priority level of any two isochronous data streams, or based on the other reasons discussed below, the managing device of system 100 can allow one isochronous data stream to barge-in on the audio playback of another isochronous data stream. As used herein, and in addition to its meaning to those with skill in the art, the term "barge-in" is intended to mean an event within the operation of system 100 where one or more audio playbacks, i.e., first audio playback PB1 and/or second audio playback PB2, that are associated with one or more isochronous data streams 164, are automatically altered to include data related to a different isochronous data stream 164 without any form of user input. In other words, upon a barge-in event, the playback currently being rendered by the speakers of the devices of system 100 may switch from a playback associated with the isochronous data stream of a first source device 106A to a playback associated with the isochronous data stream of another source device, e.g., second source device 106B. In some examples, the first audio playback PB1 associated with the isochronous data stream of the first source device can be replaced in its entirety by the second audio playback PB2 associated with the isochronous data stream of the second source device. In some examples, the first audio playback PB1 is paused, stopped, or muted prior to initiating second audio playback PB2 associated with the isochronous data stream associated with the second source device. In some examples, rather than stopping, pausing, or muting the first audio playback PB1, upon a barge-in event, the first audio playback PB1 is mixed with the second audio playback associated with the isochronous data stream of the second source device, e.g., where the user can hear a mixed audio playback which includes both first and second audio playbacks (PB1, and PB2 at the same relative volume). In some example, after mixing the playback audio data of the two isochronous data streams, the devices of system 100 can be configured to alter or adjust the volume associated with the first audio playback PB1 data so that it is louder than the second audio playback PB2 data, such that the perceived volume of the first audio playback PB1 is louder than the perceived volume of the second audio playback PB2. Alternatively, as will be discussed below, the managing device or any of the devices of system 100 can parse through the meta data associated with each isochronous data stream, which can including parsing through the content of the audio language or the content of the data stream to detect a change, e.g., a switch from an inactive to active state, and upon detection of this switch, allow the one isochronous data stream to barge-in on another.

Additionally, for barge-in events such as playback of a second audio stream that barges in on playback of a first audio stream, it can be understood based on this disclosure that a device could manage the playback for itself or for another device. For instance, in some implementations, a computing device such as a smart phone or a tablet computer (also referred to as peripheral device 108 herein) could manage playback of a barge-in event for its own speakers (e.g., speakers within the housing of, or coupled to, the computing device). Similarly, a wearable audio device could manage playback of a barge-in event for its own speakers. In other implementations, a device could manage playback of a barge-in event for another device, such as a peripheral device (e.g., a smart phone) managing the barge-in event to cause playback at a wearable audio device (e.g., via a Bluetooth connection). In such implementations, the peripheral device 108 would not itself be playing audio that is barged-in on (whether or not it has, or is coupled to, any speakers), but would instead be causing audio playback at another device (specifically in the aforementioned example, at the wearable audio device) and also cause playback of the barge-in event at the other device (again, at the wearable audio device).

In one example, the priority level of each isochronous data stream 164 is based on a Received Signal Strength Indicator (RSSI) value provided by data within each isochronous data stream of plurality of isochronous data streams 164. In another example, the priority level of each isochronous data stream 164 can be based on prior user behavior, e.g., logged user data corresponding to a specific environment E or activity, or logged user behavior related to past connections, total connection time to a respective isochronous data stream 164 or source device 106, proximity to each source device 106, and/or previous sensor data obtained from the sensor or plurality of sensors of each audio device. In another example, the priority level of each isochronous data stream 164 can be predetermined based on prior user data, e.g., a predetermined order within a known environment E, i.e., a favorites list, where the user has predetermined the order of known isochronous data streams 164 that are routinely available at a particular environment E, or available while performing a known activity (e.g., running, bicycling, sitting, standing, etc.). For example, if a user goes to a particular sports bar often and routinely connects to a particular source device, e.g., a particular television, the priority level of that particular source device (television) can be higher than others. In a further example, the plurality of isochronous data streams 164 can utilize one or more advertising channels within the protocol spectrum to send advertising packets within environment E. The data included in the advertising packets of that channel may include a device Media Access Control (MAC) address or physical address that is indicative of a device type or a device class of each of the source devices 106 of the plurality of source devices 106A-106C. Based on the data included in each advertising packet, the managing device can use the device classes or device types of each source device 106 to produce the priority level discussed above. Furthermore, priority level can be determined by the content of the audio data contained in each respective isochronous data stream by parsing the meta data or advertising packets of each stream. Additionally, after parsing the meta data of each isochronous data stream, the devices of system 100 can increase or decrease the priority level of a given audio data stream based on a switch from an active to inactive state, e.g., from no audio data being played to audio data being played. It should also be appreciated that the examples above related to priority level can be layered. For example, the priority level can be determined based on a determination of device type or device class from the advertising packets in each isochronous data stream 164 of the plurality of isochronous data streams 164A-164C, and then of the devices in a particular device class, e.g., televisions, the priority level can further rank or organize the plurality of isochronous data streams based on RSSI levels of the televisions within environment E. It should be appreciated that any conceivable combination or layering of these methods of generating the priority levels of each isochronous data stream may be utilized.

Thus, in one example operation illustrated in FIG. 6, system 100 can a set of paired or otherwise pre-registered audio devices, i.e., first device 102 (e.g., a truly wireless earbud) and second device 104 (e.g., a truly wireless earbud) within environment E, where environment E is an airport terminal, or waiting area within an airport terminal, having a plurality of source devices capable of simultaneously broadcasting a respective plurality of isochronous data streams 164A-164C. In this example, two isochronous data streams 164A-164B are associated with wirelessly enabled televisions and contain audio data associated with a tv show, movie, or other video media being displayed on or broadcast from source devices 106A-106B, respectively. Additionally, at least one isochronous data stream, e.g., isochronous data stream 164C is associated with audio data associated with the airport or terminal's PA system which can provide periodic bursts of audio data, e.g., gate announcements. Each device within system 100, i.e., first device 102 and second device 104, can receive each of the plurality of isochronous data streams 164A-164C. In this example, one of the devices, e.g., first device 102, can be designated or otherwise assigned the role of manager within the system. The managing device, e.g., first device 102, is configured to coordinate the playback of each device within the system using, for example, first communication data stream 162A (shown in FIG. 5) based on priority level information obtained from each isochronous data stream 164. In this example, the first audio device 102 can determine that, isochronous data stream 164C (associated with the airport's PA system) has a higher priority level, e.g., a first priority level 166 (shown in FIGS. 2A-3), than the priority level associated with the isochronous data streams 164A-164B from the source devices 106A-106B. e.g., a second priority level 168 (shown in FIGS. 2A-3). In this example, while isochronous data stream 164C is not active, e.g., where no gate or other announcements are made over the PA system, first device 102 can manage the audio playbacks of the first device 102 and second device 104 such that first audio playback PB1 of first device 102 includes data associated with the isochronous data stream 164A of first source device 106A and second audio playback PB2 of second device 104 includes data associated with the isochronous data stream 164B of second source device 106B. As discussed above, it should be appreciated that the simultaneous audio playback within each device may be separate and distinct, i.e., associated with different isochronous data streams 164. The managing device, e.g., first device 102, can constantly scan or periodically scan the environment E and/or isochronous data streams 164 for a change in the status or priority level of each isochronous stream and can adjust accordingly. For example, should isochronous data stream 164C become active, e.g., where a gate or other announcement is made over the PA system, first device 102 can manage the audio playbacks of the first device 102 and second device 104 such that first audio playback PB1 of first device 102 includes data associated with the isochronous data stream 164C of source device 106C (the PA system) and/or such that second audio playback PB2 of second device 104 includes data associated with the isochronous data stream 164C of second source device 106C. In this way, when the PA system becomes active, the managing device can allow the isochronous data stream with the higher priority to barge-in on, and automatically take over the audio playbacks of, one or more audio devices within the system. As discussed above, it should be appreciated that second device 104 and/or peripheral device 108 can be designated or otherwise assigned the role of managing device within system 100 and can coordinate audio playbacks of the audio devices according to the priority levels of each isochronous stream 164 within system 100 as described above. Additionally, it should be appreciated that, prior to taking over or replacing first audio playback PB1 with second audio playback PB2, the managing device, i.e., first device 102, may pause, stop, or mute audio playback PB1. Moreover, rather than take over the first audio playback PB1 and replace it with second audio playback PB2, it should be appreciated that first audio playback PB1 and second audio playback PB2 can be mixed and played back simultaneously, or in some examples, can be mixed and one playback can be made louder than the other, e.g., second audio playback PB2 can be louder than first audio playback PB1.

In another example, switching between audio playbacks using the devices of system 100, or allowing one audio playback to barge-in on the other may be determined without regard to priority level, and instead may be based solely on the change in state, status, or a change in the data of the isochronous data streams being received. For example, the managing device or the devices of system 100 can receive the plurality of isochronous streams 164A-164C and indicate to first device 102 and second device 104 that first audio playback PB1 and second audio playback PB2 should be associated with an isochronous data stream, e.g., second isochronous data stream 164B from second source device 106B. While causing the first audio playback PB1 and second audio playback PB2, the managing device may scan for, detect, or identify a change in one or more of the remaining isochronous data streams, e.g., first isochronous data stream 164A (e.g., first isochronous data stream may change from an inactive state to an active state), and can indicate to first device 102 and second device 104 that first audio playback PB1 and second audio playback PB2 should be associated with first isochronous data stream 164A based on the change.

In some examples, assigning a single device as manager, and thus assigning a single device with the responsibility to periodically or constantly scan environment E for changes in priority level and/or for changes in the available isochronous data streams 164, can cause increased and uneven power consumption of the managing device with respect to the other devices within system 100. Thus, system 100 can alternate the role of manager and offload the scanning responsibility and/or functionality of the managing device to different devices within system 100 during different time intervals to equalize the increased power needs of the managing device. For example, one device can be assigned the role of manager during a first time interval 170 and a second device can be assigned the role of manager during a second time interval 172, where the second time interval 172 is different than the first time interval 170 and after the first time interval 170. In one example the first time interval 170 and the second time interval 172 can be 10 ms, i.e., the time between isochronous events within each isochronous data stream. It should be appreciated that other time intervals are possible, e.g., 50 ms, 100 ms, 200 ms, 1 second, 2 seconds, etc. Alternatively, rather than toggle the role of manager, one device may be assigned the role of manager and the role of scanning device can be offloaded between any of the devices within the system in an alternating manner over these time intervals. Additionally, the first device 102 and/or the second device 104 can independently monitor activity within environment E, e.g., the plurality of isochronous data streams 164A-164C, and compare the information obtained to a common set of decision criteria and inform the other audio device if certain criteria has been met that should trigger a barge-in event (discussed below).

Thus, in one example operation, described with reference to FIG. 6, system 100 can include a set of paired or otherwise pre-registered devices, i.e., first device 102 (e.g., a truly wireless earbud) and second device 104 (e.g., a truly wireless earbud) within environment E, where environment E is an airport terminal, or waiting area within an airport terminal, having a plurality of source devices 106 capable of simultaneously broadcasting a respective plurality of isochronous data streams 164A-164C. In this example, two isochronous data streams 164A-164B are associated with wirelessly enabled televisions and contain audio data associated with a tv show, movie, or other video media. Additionally, at least one isochronous data stream, e.g., isochronous data stream 164C is associated with audio data associated with the airport or terminal's PA system which can provide periodic bursts of audio data, e.g., gate announcements. Each device within system 100, i.e., first device 102 or second device 104, can receive each of the plurality of isochronous data streams 164A-164C. In this example, one of the devices, e.g., first device 102, can be designated or otherwise assigned the role of manager within the system. The managing device, e.g., first device 102, is configured to coordinate the playback of each audio device within the system using, for example, first communication data stream 162A based on priority level information obtained from each isochronous data stream 164. Additionally, first device 102 is also designated, at least initially, with the role of stream scanner within system 100, i.e., the device responsible for periodically or continuously scanning environment E for changes in isochronous data streams 164. In this example, the first device 102 can determine that, isochronous data stream 164C (associated with the airport's PA system) has a higher priority level, e.g., a first priority level 166, than the priority level associated with the isochronous data streams 164A-164B from the source devices 106A-106B. i.e., a second priority level 168. In this example, while isochronous data stream 164C is not active, e.g., where no gate or other announcements are made over the PA system, first device 102 can manage the audio playbacks of the first device 102 and second device 104 such that first audio playback PB1 of first device 102 includes data associated with the isochronous data stream 164A of first source device 106A (television) and second audio playback PB2 of second device 104 includes data associated with the isochronous data stream 164B of second source device 106B (television). As discussed above, it should be appreciated that the simultaneous audio playback within each audio device may be separate and distinct, i.e., associated with different isochronous data streams 164.

The managing device and/or the device that has been assigned the role of stream scanner, e.g., first device 102, can constantly scan or periodically scan the isochronous data streams 164 within environment E during a first time interval 170 for a change in the status or priority level of each isochronous stream and can adjust accordingly. It should be appreciated that, at least in some examples, the stream scanner discussed herein is the "broadcast assistant" defined by version 5.2 of the Bluetooth Core Specification. In other examples, the managing device may be referred to as a scan off-loader device, i.e., a device that is responsible for periodically scanning environment E during the time intervals discussed herein. To equalize the increased power consumption caused by periodically or continuously scanning environment E for changes in isochronous data streams 164, the role of managing device and/or the role of stream scanner can be alternated between the devices of system 100 during different time intervals. In this example, first device 102 can take the role of stream scanner during the first time interval 170 (shown in FIGS. 2A-3), during which first device 102 scans the environment E for changes in isochronous data streams 164 that would alter the current audio playback scheme, if any changes occur during the first time interval, first device 102 can coordinate or otherwise manage the audio playbacks as discussed above. After termination of the first time interval 170, the role of manager and/or the role of stream scanner can be passed to second device 104 during a second time interval 172 (shown in FIGS. 2A-3), during which second audio device 104 scans the environment E for changes in isochronous data streams 164 that would alter the current audio playback scheme, if any changes occur during the second time interval, second audio device 104 can coordinate or otherwise manage the audio playbacks of each device as discussed above.

Thus, in this example, should isochronous data stream 164C become active during the first time interval 170, e.g., where a gate or other announcement is made over the PA system, first device 102 can manage the audio playbacks of the first device 102 and second device 104 such that first audio playback PB1 of first device 102 includes data associated with the isochronous data stream 164C of source device 106C (the PA system) and/or such that second audio playback PB2 of second device 104 includes data associated with the isochronous data stream 164C of second source device 106C. Similarly, should isochronous data stream 164C become active during the second time interval 172, e.g., where a gate or other announcements is made over the PA system, second device 102 can manage the audio playbacks of the first device 102 and second device 104 such that first audio playback PB1 of first device 102 includes data associated with the isochronous data stream 164C of source device 106C (the PA system) and/or such that second audio playback PB2 of second device 104 includes data associated with the isochronous data stream 164C of second source device 106C.

Although only two time intervals are described herein, i.e., first time interval 170 and second time interval 172, it should be appreciated that more than two time intervals can be utilized and that the roles discussed herein can alternate between each additional time interval such that only one device of audio system is assigned the role of stream scanner during any one interval and the role alternates so that power consumption between the devices of the system equalize. As discussed above, it should be appreciated that peripheral device 108 can be designated or otherwise assigned the role of managing device and/or stream scanner within system 100 and can coordinate audio playbacks of the devices according to the priority levels of each isochronous stream 164 within system 100 as described above. Additionally, and as discussed above, it should be appreciated that the data streams 164A-164C can be unicast isochronous streams or non-isochronous data streams, e.g., data streams that utilize Bluetooth Classic, Bluetooth Low-Energy, or Wi-Fi protocols that are not isochronous. Therefore the first data stream 164A (hereinafter referred to as "the active stream") can be a non-isochronous data stream and the data stream that barges in on first data stream 164A, e.g., data stream 164C (hereinafter referred to as "the barge-in data stream"), can also be a non-isochronous data stream. In one example, the data stream that is barging in on the first data stream 164A is generated by the user's smart phone or personal computer, e.g., where the user is listening to audio generated by a smart TV and the user receives a phone call on their smart phone.

In this example, the audio content of the phone call can barge in on the audio stream from the smart TV, as set forth above.

Moreover, it should be appreciated that the original data stream, i.e., the active stream, e.g., data stream 164A, could be selected from any type of data stream, e.g., a Bluetooth Classic data stream, a Bluetooth Low-Energy data stream, a unicast isochronous stream, a broadcast isochronous stream, a connected isochronous stream, a Wi-Fi data stream, etc. Additionally, the barge-in data stream can similarly be selected from any type of data stream, e.g., a Bluetooth Classic data stream, a Bluetooth Low-Energy data stream, a unicast isochronous stream, a broadcast isochronous stream, a connected isochronous stream, a Wi-Fi data stream, etc. Thus, it should be appreciated that in some examples, the active stream can be selected from any data stream, while the barge-in data stream can be an isochronous data stream as described above. Additionally, in some examples, the active stream is an isochronous data stream and the barge-in data stream is selected from any type of data stream, including an isochronous data stream. In other words, in some examples, at least one of the active data stream or the barge-in data stream is an isochronous data stream.

In some examples, one of the types of data streams is a broadcast data stream, where broadcast data stream is intended to mean a data stream which utilizes Bluetooth or Wi-Fi protocols but provides unidirectional communications only, e.g., where only one source device, e.g., a single source device of source devices 106, is broadcasting data to one or more devices simultaneously. Thus, in some examples, the active stream may be a broadcast stream (as defined above) while the barge-in stream can be selected from any of the types of data streams discussed above. Additionally, the active stream may be any type of data stream while the barge-in data stream could be a broadcast data stream (as defined above). Finally, it should be appreciated that the active data stream and the barge-in data stream can both be broadcast data streams (as defined above). In other words, in some examples, at least one of the active data stream or the barge-in data stream is a broadcast data stream.

Figure 7:
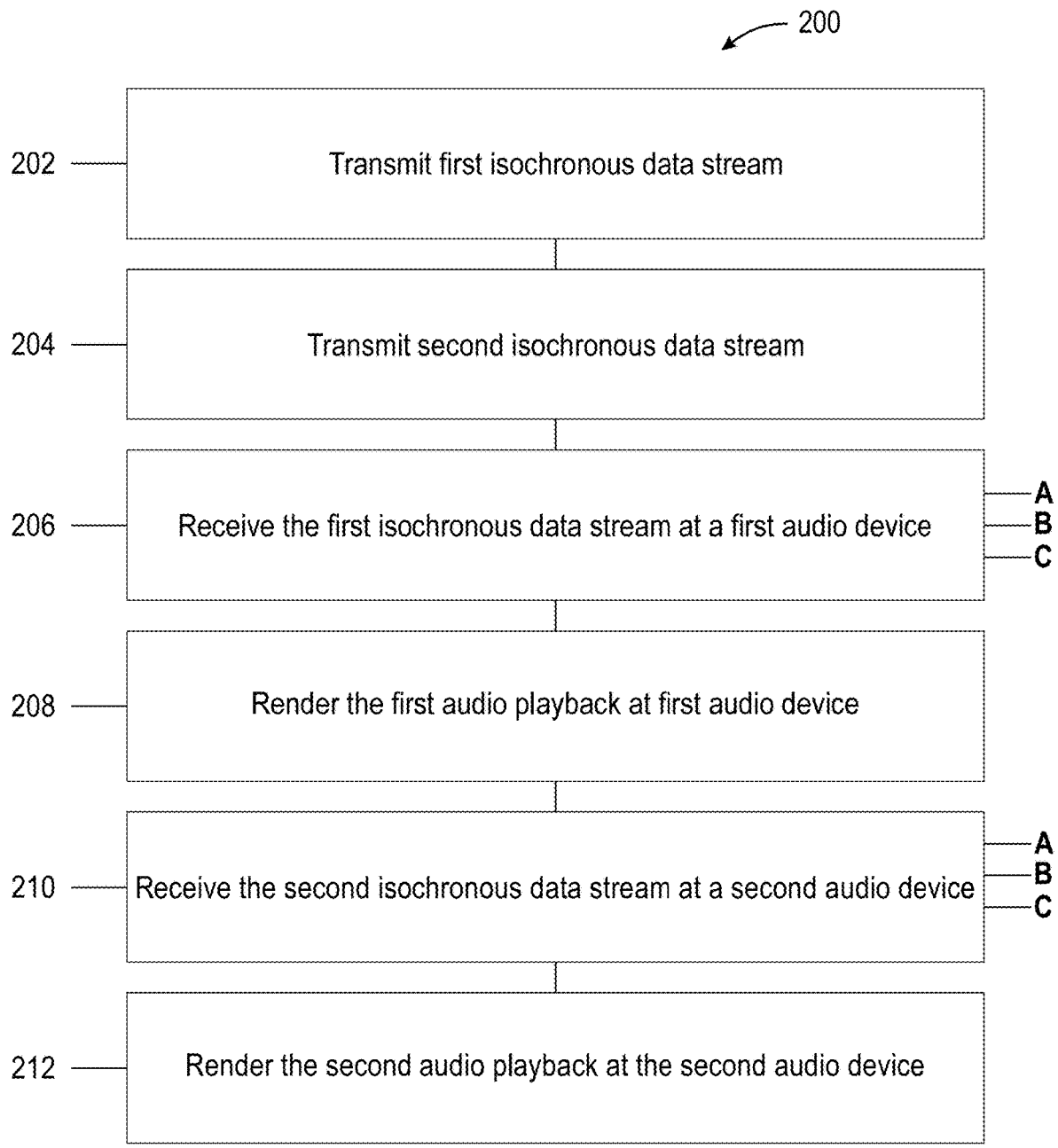
FIG. 7 is a flow chart illustrating the steps of a method according to the present disclosure.
Figure 8:
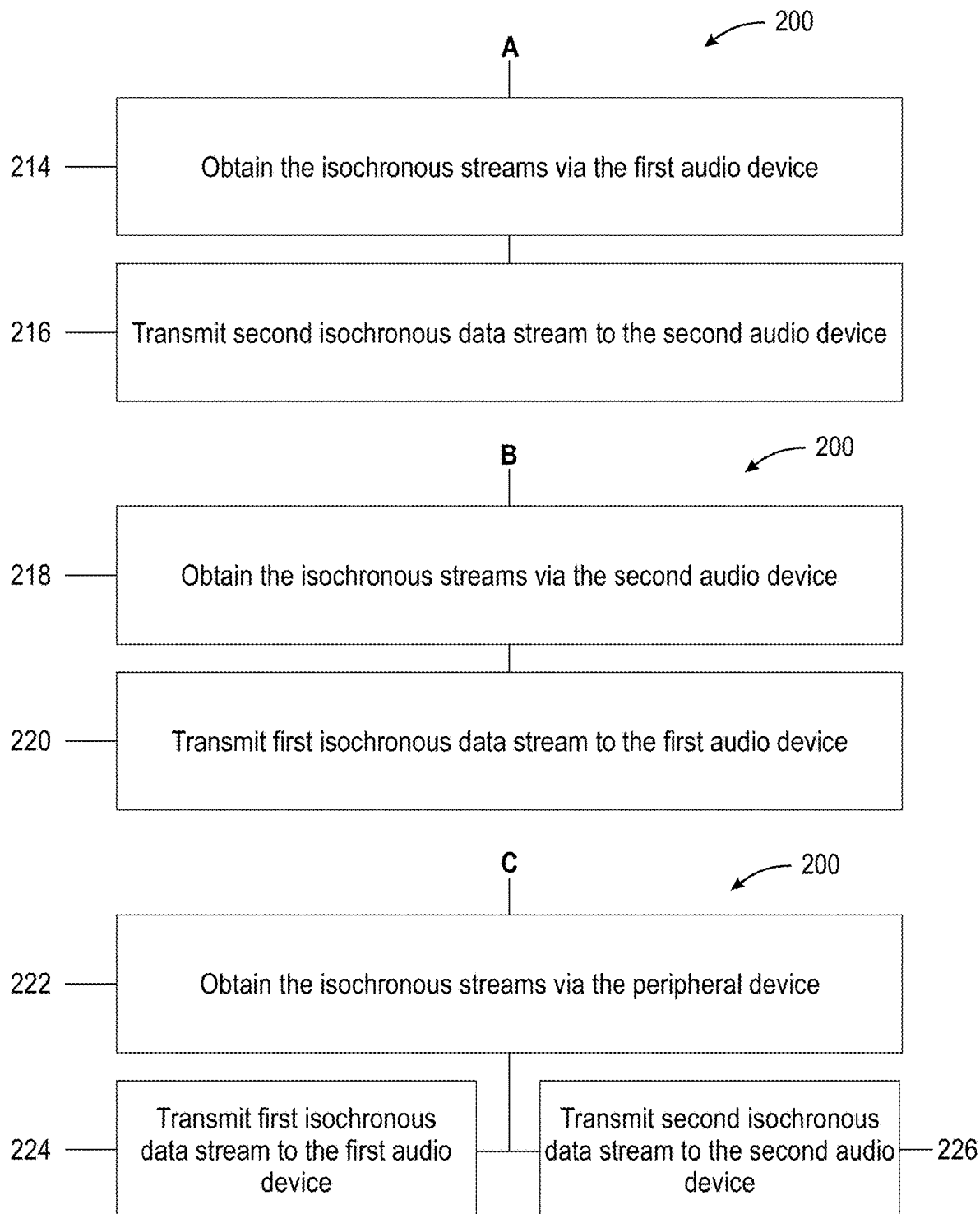
FIG. 8 is a flow chart illustrating the steps of a method according to the present disclosure.

FIG. 7 illustrates a flow chart comprising the steps of method 200 according to the present disclosure. In one example, method 200 includes: transmitting, via a first source device 106A, a first isochronous data stream 164A within an environment E (step 202); transmitting, via a second source device 106B, a second isochronous data stream 164B within the environment E (step 204); receiving, at a first audio device 102 comprising a first speaker 122, the first isochronous data stream 164A within the environment E (step 206); rendering a first audio playback PB1 via the first speaker 122, the first audio playback PB1 including data obtained from the first isochronous data stream 164A (step 208); receiving, at a second audio device 104 comprising a second speaker 140, the second isochronous data stream 164B within the environment E (step 210); and rendering a second audio playback PB2 via the second speaker 140, the second audio playback PB2 including data obtained from the second isochronous data stream 164B, wherein the first audio device 102 is paired with the second audio device 104 (step 212). As illustrated in FIGS. 7-8, three alternative paths can be taken prior to rendering the audio playbacks described, one example, shown associated with option A, includes obtaining, via the first audio device 102, the first isochronous data stream 164A and the second isochronous data stream 164B within the environment E (step 214); and transmitting the second isochronous data stream 164B to the second audio device 104 (step 216). In another example, illustrated by path B, method 200 can include obtaining, via the second audio device 104, the first isochronous data stream 164A and the second isochronous data stream 164B within the environment E (step 218); and transmitting the first isochronous data stream 164A to the first audio device 102 (step 220). In another example, illustrated with respect to path C, method 200 can include obtaining, via a peripheral device 108, the first isochronous data stream 164A and the second isochronous data stream 164B within the environment E (step 222); transmitting the first isochronous data stream 164A to the first audio device 102 (step 224); and transmitting the second isochronous data stream 164B to the second audio device 104 (step 226).

Figure 9:
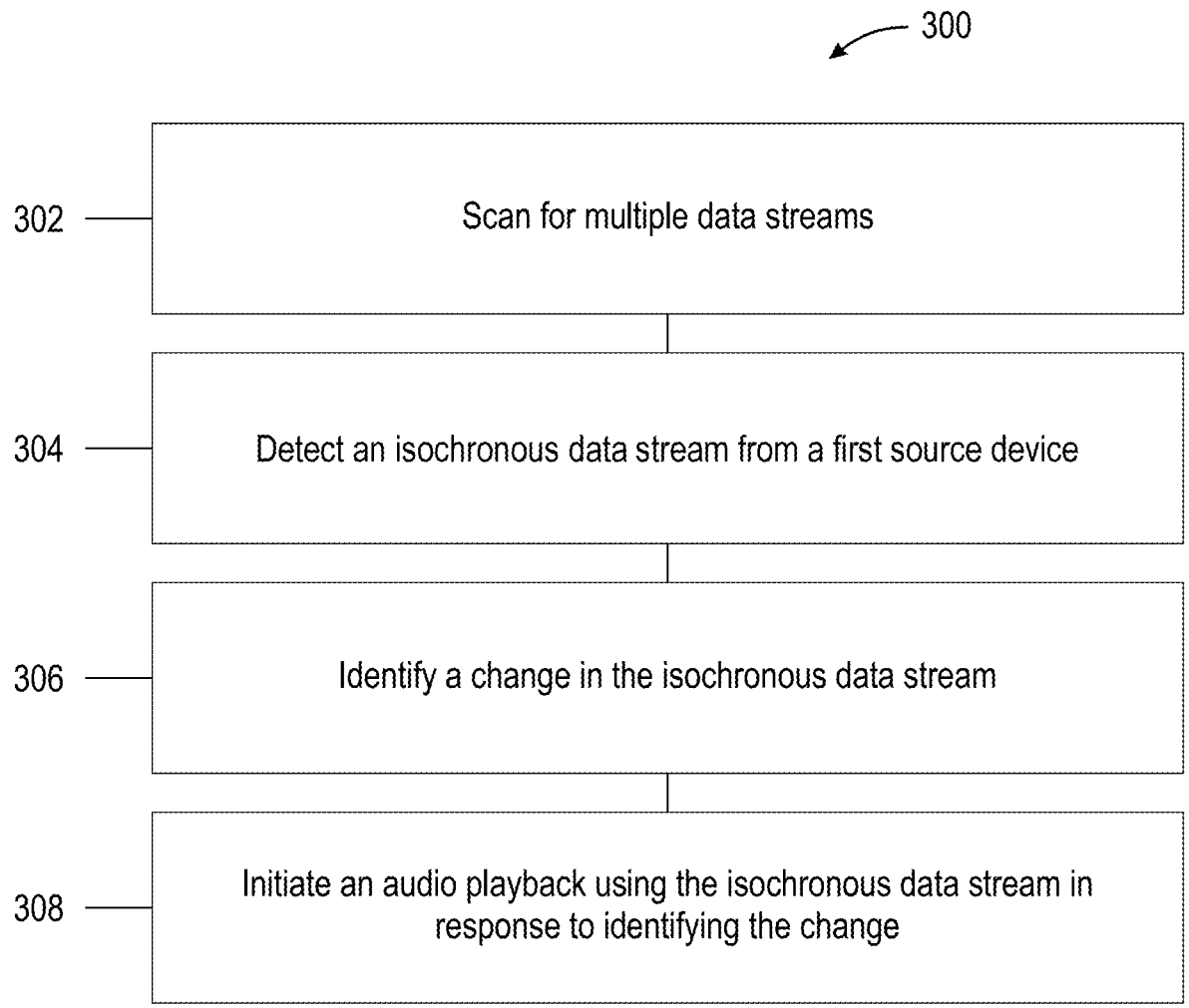
FIG. 9 is a flow chart illustrating the steps of a method according to the present disclosure.

FIG. 9 illustrates a flow chart comprising the steps of method 300 according to the present disclosure. In one example, method 300 includes: scanning for, via a radio, multiple data streams (step 302); detecting, via at least one processor, an isochronous data stream from a first source device (step 304); identifying, via the at least one processor, a change in the isochronous data stream while causing an audio playback from a data stream from a second source device (306); initiating an audio playback using the isochronous data stream in response to identifying the change (step 308).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wearable audio device for managing data streams from multiple sources, the wearable audio device comprising circuitry including:
    a radio configured to scan for multiple data streams; and
    at least one processor configured to:
        detect an isochronous data stream from a first source device, and
        in response to identifying a change in the isochronous data stream while causing an audio playback from a data stream from a second source device, initiate an audio playback, via an acoustic transducer of the wearable audio device, using the isochronous data stream, wherein the change in the isochronous data stream is identified based on advertising packets indicating the isochronous data stream includes an active audio stream;
    wherein the radio is further configured to, in response to the processor identifying the change in the isochronous data stream, initiate an audio playback based on the isochronous stream in a second wearable audio device connected to the wearable audio device, wherein the wearable audio device is wirelessly connected to the second wearable audio device, wherein the wearable audio device is configured to be secured proximate to or within a first ear of a user, wherein the second wearable audio device is configured to be secured proximate to or within a second ear of a user, and wherein the radio of the wearable audio device initiates the audio playback of the second wearable device by wirelessly communicating with the second wearable device.

2. The wearable audio device of claim 1, wherein the data stream from the second source device is another isochronous data stream.

3. The wearable audio device of claim 1, wherein the data stream from the second source device is a Bluetooth Classic Audio data stream.

4. The wearable audio device of claim 1, wherein identifying the change in the isochronous data stream includes parsing metadata associated with the isochronous data stream and wherein the metadata indicates a change in audio language and/or content in the isochronous data stream that has been selected by and/or is desirable to the user of the device.

5. The wearable audio device of claim 1, wherein the isochronous data stream is a Bluetooth LE Audio data stream and wherein the isochronous data stream includes audio data encoded using the Low Complexity Communications Codec (LC3).

6. The wearable audio device of claim 1, wherein the audio playback from the data stream from the second source device is stopped and/or muted prior to initiating audio playback using the isochronous data stream.

7. The wearable audio device of claim 1, wherein initiating audio playback using the isochronous data stream includes mixing audio data from the isochronous data stream with audio data from the data stream from the second audio source device.

8. The wearable audio device of claim 7, wherein the audio data from the isochronous data stream is played back at a louder volume than the audio data from the data stream.

9. The wearable audio device of claim 1, wherein the wearable audio device is an earbud.

10. The wearable device of claim 1, wherein the change in the isochronous stream is detected while the radio of the wearable audio device causes an audio playback in the second wearable device based on a data stream transmitted by a third source device.

11. A method for managing data streams from multiple sources, the method comprising:
    scanning for, via a radio of a wearable audio device, multiple data streams;
    detecting, via at least one processor of the wearable audio device, an isochronous data stream from a first source device;
    identifying, via the at least one processor of the wearable audio device, a change in the isochronous data stream while causing an audio playback from a data stream from a second source device, wherein the change in the isochronous data stream is identified based on advertising packets indicating the isochronous data stream includes an active audio stream;
    initiating, via an acoustic transducer of the wearable audio device, an audio playback using the isochronous data stream in response to identifying the change; and
    initiating an audio playback based on the isochronous stream in a second wearable audio device connected to the wearable audio device in response to the at least one processor identifying the change in the isochronous data stream, wherein the wearable audio device is wirelessly connected to the second wearable audio device, wherein the wearable audio device is configured to be secured proximate to or within a first ear of a user, wherein the second wearable audio device is configured to be secured proximate to or within a second ear of a user, and wherein the radio of the wearable audio device initiates the audio playback of the second wearable device by wirelessly communicating with the second wearable device.

12. The method of claim 11, wherein the data stream from the second source device is another isochronous data stream.

13. The method of claim 11, wherein the data stream from the second source device is a Bluetooth Classic Audio data stream.

14. The method of claim 11, wherein identifying the change in the isochronous data stream includes parsing metadata associated with the isochronous data stream and wherein the metadata indicates a change in audio language and/or content in the isochronous data stream that has been selected by and/or is desirable to the user of the device.

15. The method of claim 11, wherein the isochronous data stream is a Bluetooth LE Audio data stream and wherein the isochronous data stream includes audio data encoded using the Low Complexity Communications Codec (LC3).

16. The method of claim 11, wherein the audio playback from the data stream from the second source device is stopped and/or muted prior to initiating audio playback using the isochronous data stream.

17. The method of claim 11, wherein initiating audio playback using the isochronous data stream includes mixing audio data from the isochronous data stream with audio data from the data stream from the second audio source device.

18. The method of claim 17, wherein the audio data from the isochronous data stream is played back at a louder volume than the audio data from the data stream.

19. The method of claim 11, wherein the wearable audio device is an earbud.

20. The method of claim 11, wherein the change in the isochronous stream is detected while the radio of the wearable audio device causes an audio playback in the second wearable device based on a data stream transmitted by a third source device.

* * * * *